(12) United States Patent
Engelhardt et al.

(10) Patent No.: US 6,776,375 B1
(45) Date of Patent: Aug. 17, 2004

(54) PAYLOAD DEPLOYMENT SYSTEM WITH AN INTERNAL CARGO UNIT

(75) Inventors: Johnnie Paul Engelhardt, West Columbia, TX (US); Scott David Ritterhouse, La Porte, TX (US)

(73) Assignee: Muniz Engineering, Inc., Houston, TX (US)

( * ) Notice: Subject to any disclaimer, the term of this patent is extended or adjusted under 35 U.S.C. 154(b) by 0 days.

(21) Appl. No.: 10/376,728

(22) Filed: Feb. 28, 2003

(51) Int. Cl.[7] ................................................ B64G 1/00
(52) U.S. Cl. .............................. 244/158 R; 244/137.1
(58) Field of Search ......................... 244/158 R, 137.1, 244/137.4; 89/1.57, 1.81; 114/318, 319

(56) References Cited

U.S. PATENT DOCUMENTS

| | | | | |
|---|---|---|---|---|
| 3,075,301 A | * | 1/1963 | Fiedler et al. ................ | 434/13 |
| 3,930,448 A | * | 1/1976 | Barber et al. ................ | 102/348 |
| 4,488,489 A | * | 12/1984 | Schoffl ....................... | 102/489 |
| 6,164,179 A | * | 12/2000 | Buffman ..................... | 89/1.81 |
| 2002/0178960 A1 | * | 12/2002 | Ramaswamy ............... | 102/439 |

* cited by examiner

*Primary Examiner*—J. Woodrow Eldred
(74) *Attorney, Agent, or Firm*—Wong, Cabello, Lutsch, Rutherford & Brucculeri, LLP

(57) ABSTRACT

A payload deployment system is described that includes an external shell or tube within which an internal cargo unit is placed. The internal cargo unit encapsulates one or more payloads and seals the external shell or tube. Payloads are deployed in a two step process. The first step involves ejecting the internal cargo unit from the external shell or tube. The second step involves separating the internal cargo unit into two or more pieces in a controlled and, possibly, time-sequenced manner so as to deploy one or more payloads housed within the internal cargo unit. The internal cargo unit is ejected from the external shell or tube by a first separation device and the internal cargo unit is separated by a second separation device. Illustrative separation devices include, but are not limited to, pyrotechnic and clamp-and-spring devices. Additional payloads may be fixedly attached to an inner surface of the external shell or tube in such a manner that they remain in place even after the internal cargo unit is ejected and the associated payloads are deployed.

18 Claims, 4 Drawing Sheets

PAYLOAD DEPLOYMENT SYSTEM WITH AN INTERNAL CARGO UNIT

STATEMENT OF GOVERNMENT INTEREST

The Government has rights in this invention pursuant to Contract No. F04701-98-D-0102 awarded by the U.S. Department of the Air Force.

BACKGROUND

The invention relates generally to space-based payload deployment systems and, more particularly but not by way of limitation, to a self-contained system for ejecting small to medium sized payloads from a space vehicle.

To deploy small to medium sized payloads from the Space Transport System's Orbiter vehicle (the "Space Shuttle"), the National Aeronautics and Space Administration (NASA) currently uses a design known as a Get Away Special ("GAS") carrier. The GAS carrier system provides mechanical and electrical support for an encapsulated payload. GAS carriers can accommodate payloads up to approximately 200 pounds in a volume of up to 5 cubic feet and are typically mounted to a Space Shuttle's cargo bay side wall or to a cross cargo bay truss. For payloads that are to be deployed (ejected) during flight, GAS carriers are fitted with a motorized door. Prior to deployment, the door is opened and a launch mechanism within the carrier is activated to eject the payload.

Door mechanisms provide safety and operational failure potential that can impact a Space Shuttle's on-orbit operations. For example, prior to deploying a payload the door must be opened. If the door fails to open, the deployment must be aborted. If the door opens, it must be closed prior to the Space Shuttle returning to earth. Should the door fail to close following deployment (or if the deployment fails for another cause), an astronaut may be required to egress the vehicle to manually close it. Such activities (known as a space-walk or Extra-Vehicular Activity, EVA) present their own risks and drive additional safety requirements for the payload and deployment system. One illustrative safety requirement is the need to eliminate "sharp edges" that may endanger an astronaut during an EVA.

Thus, it would be beneficial to provide a payload ejection means that has in inherently reduced risk of failure and, in the event of failure, manifests a safe return to earth environment by (for example, by not introducing potential sharp edges to astronauts engaged in extravehicular activities). This, and other benefits and advances are provided by a deployment system in accordance with the invention.

SUMMARY

In one embodiment, the invention provides a system to deploy one or more payloads. The system includes an external tube having an open end, a payload container that fits within the external tube and having an end cap that, when in place, seals the external tube's open end, and a separation means to separate or eject the payload container from the external tube. In another embodiment, the payload may be directly coupled to the end cap such that no additional payload container is needed. In either, or both of these embodiments, additional payload(s) may be coupled to an inner surface of the external tube distal from the end cap. If the additional payload(s) are fixedly attached to the external tube, they may be exposed to microgravity but not deployed. If the additional payload(s) are coupled to the external tube via a separation system, they may be deployed. Embodiments utilizing a payload container may encapsulate one or more payloads and may further be adapted to separate into two or more pieces to deploy each of the one or more payloads in a controlled manner subsequent to the payload container's ejection from the external tube.

DETAILED DESCRIPTION

The invention relates generally to space-based payload deployment systems and, more particularly but not by way of limitation, to a self-contained system for ejecting small to medium sized payloads from a space vehicle. The following embodiments of the invention, described in terms of a Space Shuttle side-wall mounted canister, are illustrative only and are not to be considered limiting in any respect.

Figure 1A:
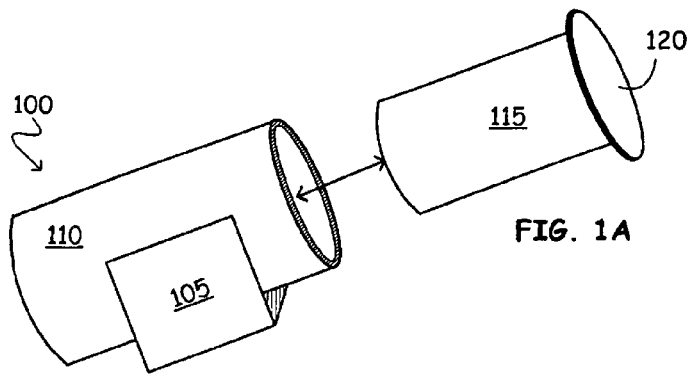
FIGS. 1A, 1B and 1C show isometric, end and side views of a payload deployment system in accordance with one embodiment of the invention.
Figure 1B:
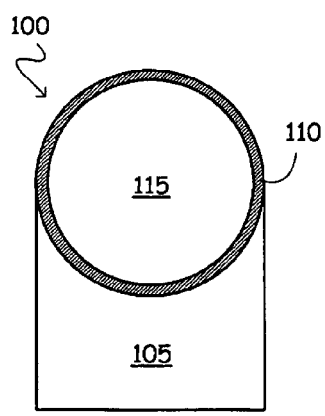
Figure 1C:
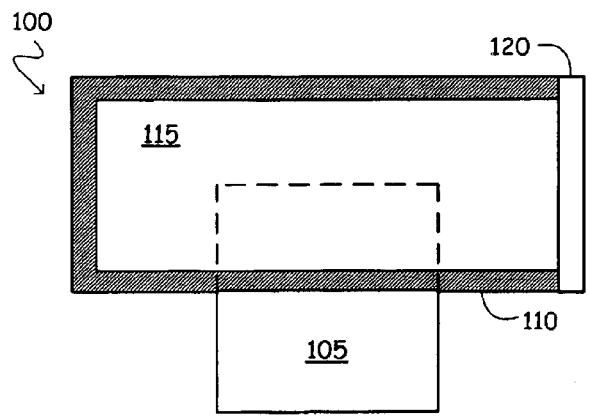

Referring to FIGS. 1A (isometric view), 1B (end view) and 1C (side view), payload deployment system 100 in accordance with one embodiment of the invention includes mounting means 105, external shell 110, internal cargo unit 115 and associated end cap 120. As shown, FIG. 1A presents an exploded isometric view illustrating how internal cargo unit 115 fits inside external shell 110, FIG. 1B presents an end view sans end cap 120 and FIG. 1C presents a side view of deployment system 100. Mounting means 105 provides a mechanism to mechanically attach deployment system 100 to a space vehicle such as, for example, a cargo bay wall of the Space Shuttle. External shell 110 provides a mechanical interface between internal cargo unit 115 and the supporting space vehicle and further provides an external surface that is safe from the standpoint of launch and "failure to deploy" operations. Internal cargo unit 115 (including end cap 120) totally encapsulates the payload and is ejected from external shell 110 during deployment operations. After ejection, internal s cargo unit 115 separates in a controlled manner to complete deployment of one or more individual payloads housed therein.

Figure 2:
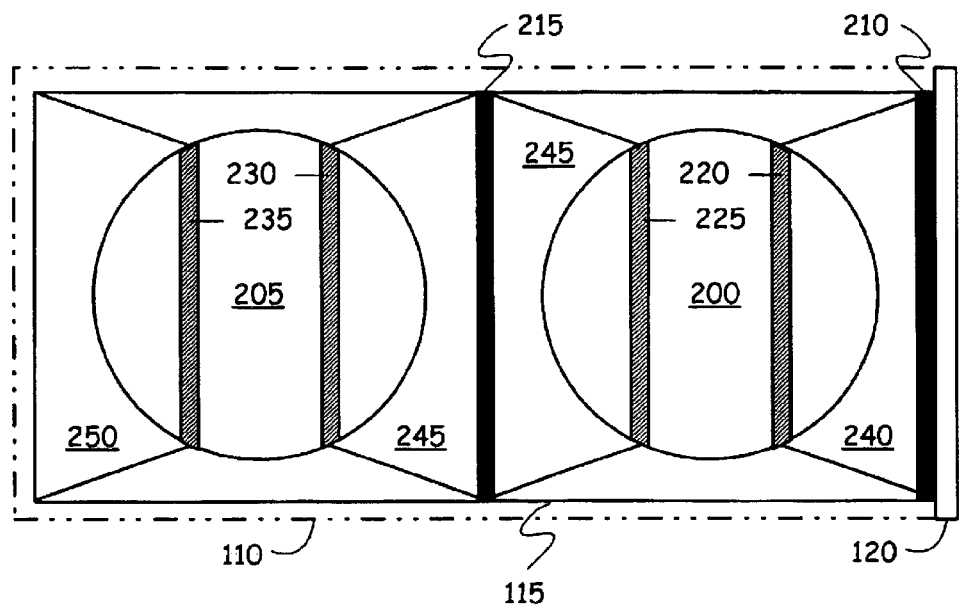
FIG. 2 illustrates a system in accordance with the invention designed to deploy two spherical payloads.

Referring to FIG. 2, in one embodiment of the invention internal cargo unit 115 encapsulates first payload 200 and second payload 205 and comprises primary separation plane mechanism 210, secondary separation plane mechanism 215, payload support bands 220, 225, 230 and 235 and payload support structures 240, 245 and 250. Primary separation plane mechanism 210 functions to separate internal cargo unit 115 (including end cap 120) from external shell 110. In practice, secondary separation plan mechanism 215 typically comprises two separation mechanisms, one to separate support structure 245 from payload 200 and another to separate support structure 245 from payload 205. Primary and secondary separation plane mechanisms 210 and 215 may be any suitable separation means such as, for example, a Lightband separation system from Planetary Systems Corporation of Silver Spring, Maryland or a Clamp (Marmon) Band separation system from Starsys Research Corporation of Boulder, Colo.

Each of primary and secondary separation plane mechanisms 210 and 215 may independently and separately provide payload spin-up capabilities. Further, each of primary and secondary separation plane mechanisms 210 and 215 may employ the same or different types of mechanisms. For example, primary separation plane mechanism 210 may employ a pyrotechnic device and secondary separation plane 215 may employ a non-pyrotechnic.

Support bands 220 through 235 and structures 240 through 250 provide mechanical support to payloads 200 and 205. In one embodiment, support bands 220 through 235 are rings that create a cradle within which the payload is rested (see FIG. 2). To protect the payloads, a soft polymer gasket may be placed between each support band and the payloads. Alternatively, a soft polymer coating may be applied to each of the support bands 220 through 235. One illustrative soft polymer is Vitan Rubber. Support structures 240 and 250 provide mechanical support for separation rings 220 and 235 respectively. Support structure 245 provide physical separation between payloads 200 and 205, mechanical support for separation bands 225 and 230 and may also house control circuitry needed to activate one or more of the separation plane mechanisms 210 and 215 in a controlled manner (not shown, see discussion below). In one embodiment, primary separation plane mechanism 210 is activated from the launch vehicle, while secondary separation plane mechanism 215 (typically two separate devices, see discussion above) is activated by the aforementioned control circuitry. In another embodiment, the aforementioned control circuitry may activate both the primary and secondary separation plane mechanisms. Support structures 240, 245 and 250 may also incorporate spring means at one or more points where the bands/structures meet a payload. The spring means may be used to create a separation force at least large enough to break surface friction between a payload and a support band.

Figure 3:
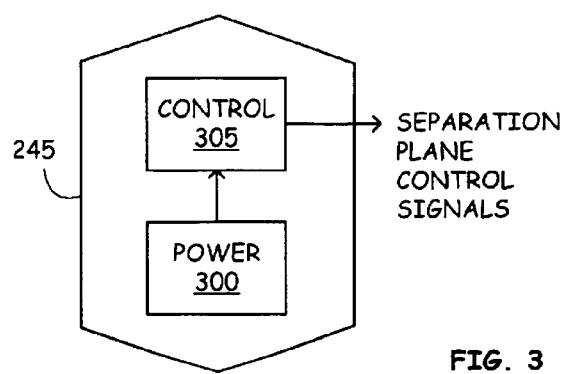
FIG. 3 shows a block diagram of internal control and power circuits for a deployment system in accordance with one embodiment of the Invention.

Referring to FIG. 3, support structure 245 may house power unit 300 and control unit 305. Power unit 300 provides the necessary operational power to effect the desired control operations. For example, power unit 300 may be a chemical battery. Control unit 305 may comprise one or more timing circuits and one or more control circuits to activate the separation plane mechanisms in a controlled manner. For example, control unit 305 may activate secondary separation plane mechanism 215 a specified time after activation of primary separation plane mechanism 210. In one embodiment, control unit 305 may comprise combinational logic. In another embodiment, control unit 305 may comprise a custom designed state machine or a programmable control device. Custom designed state machines may be embodied in a hardware device such as a printed circuit board comprising discrete logic, integrated circuits, specially designed application specific integrated circuits (ASICs) or programmable gate arrays. Storage devices suitable for tangibly embodying program instructions include all forms of non-volatile memory including, but not limited to semiconductor memory devices such as electrically programmable read only memory (EPROM), electrically erasable programmable read only memory (EEPROM) and flash devices. Other possible storage devices include magnetic disks (fixed, floppy, and removable), other magnetic media such as tape and optical media such as CD-ROM disks.

In one embodiment of deployment system 100 in accordance with the invention, mounting means 105, external shell 110 and internal cargo unit 115 are fabricated from Aluminum (e.g., 6061 Aluminum or 7075-T53 Aluminum). While other materials such as Titanium, Stainless Steel and composites are possible, it has been found beneficial to use the same material for all members to minimize problems that arise from mating materials having different thermal coefficients of expansion. More specifically, mounting means 105 has been fabricated from two inch Aluminum plates that are ribbed to reduce its weight without substantially reducing its strength. External shell 110 has been fabricated to have a 22 inch inner-diameter, a 24 inch outer-diameter and to be 54 inches in length. Internal cargo unit 115 has been fabricated to have a 21.5 inch inner-diameter, a 21.8 inch outer-diameter and to be 38 inches in length. In some embodiments, end cap 120 may be machined to include access to internal cargo unit 115 even after it has been installed into external shell 110. It has further been found beneficial to hard anodize and to Teflon® coat the inner surface of external shell 110 and the external surface of internal cargo unit 115. These procedures reduces the risk of scarring and sticking as internal cargo unit 115 is ejected from external shell 110 during payload deployment operations. A two payload embodiment of deployment system 100 fabricated in this manner (see FIG. 2) admits a first spherical payload (e.g., payload 200) having a diameter of 17.5 inches and second spherical payload (e.g., payload 205) having a diameter of 19 inches. As this embodiment demonstrates, if multiple payloads are deployed by a single internal cargo unit, it is not necessary that they be equal in size. It is possible, in fact, that the two (or more) payloads have entirely different geometries. For example, one payload could be spherical, another could be square or rectangular, and yet another could be oblong or conical. The only requirement is that support bands and/or support structures be configured to mechanically buffer and support the various payloads during ascent and further that the one or more separation plane mechanisms are able to operate with the selected geometries.

Figure 4A:
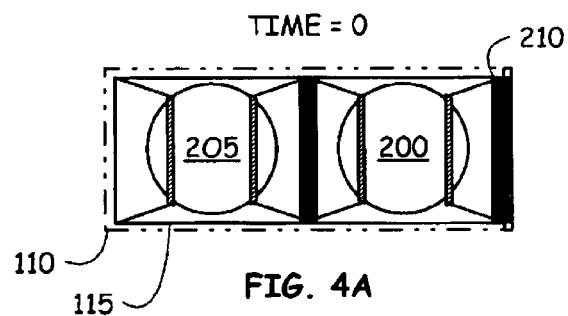
FIGS. 4A, 4B and 4C illustrate, in time sequence, payload deployment in accordance with one embodiment of the invention.
Figure 4B:
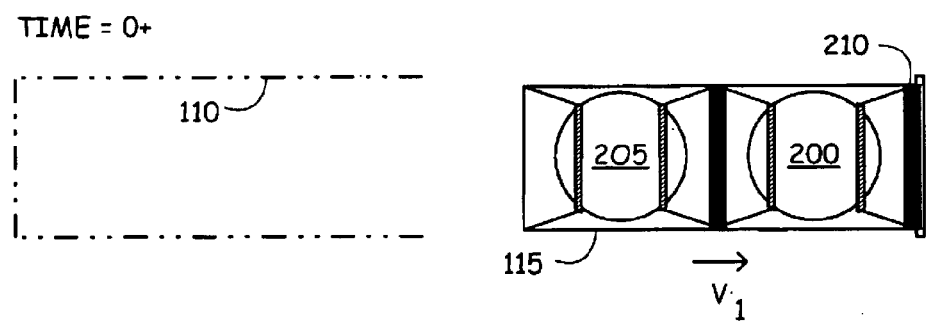
Figure 4C:
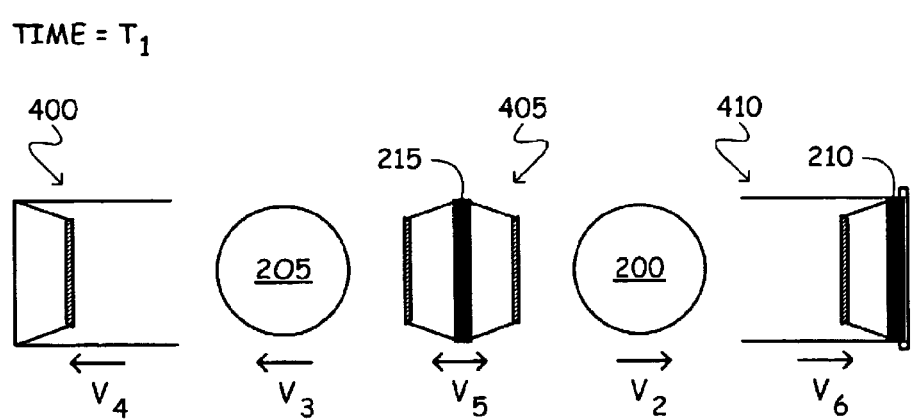

Referring now to FIGS. 4A, 4B and 4C, the two payload embodiment of FIG. 2 fabricated as indicated above is shown at three points in time to Illustrate the deployment sequence of payloads 200 and 205. Before deployment initiation (time=0), internal cargo unit 115 is encapsulated by and fixedly coupled to external shell 110 (see FIG. 4A). At the desired deployment initiation time (time=0+), primary separation plane mechanism 210 is activated causing the internal cargo unit 115 to acquire velocity $V_1$ relative to external shell 110 is (see FIG. 4B). At a predetermined later time (time=$T_1$), control unit 305 commands secondary separation plane mechanism 215 to activate causing payload 200, payload 205 and structural elements identified in FIG. 4C as 400, 405 and 410 to acquire relative velocities $V_2$, $V_3$, $V_4$, $V_5$ and $V_6$. In an illustrative embodiment wherein Lightband separation devices are used as both the primary and secondary separation plane mechanisms, and with payload 200 weighing approximately 165 pounds and payload 205 weighing approximately 110 pounds, the following velocities have been used: $V_1 \geq 2$ feet-per-second (relative to fixed external shell 110); $V_4$ and $V_6 \approx 1$ foot-per second (relative to 405); $V_2$ and $V_3$ are between 0 and 1 foot-per-second (relative to 405); and $V_5 \approx 2$ foot per-second (relative to fixed external shell 110).

Figure 5:
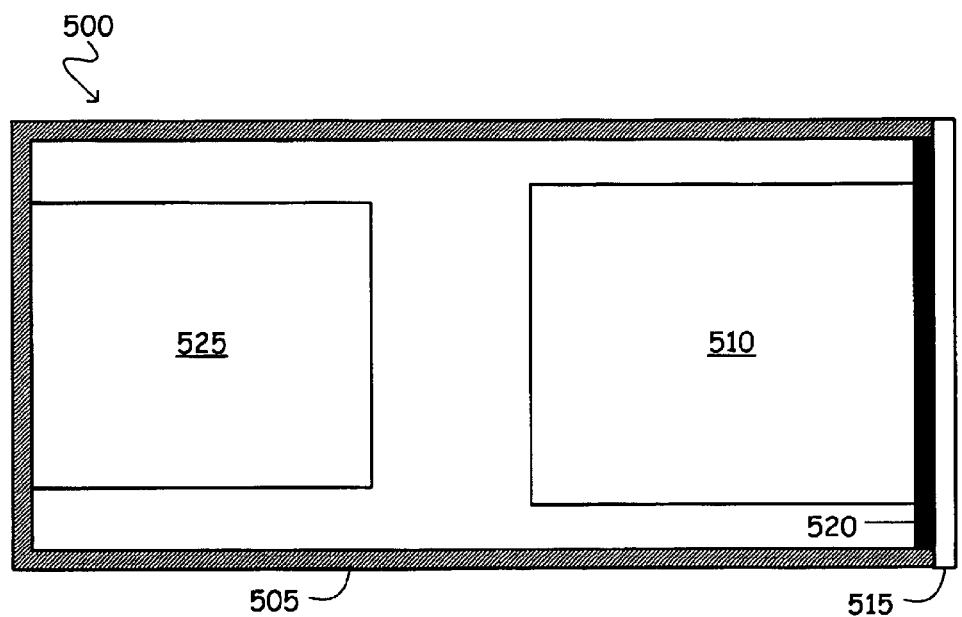
FIG. 5 illustrates a payload deployment system in accordance with another embodiment of the Invention.

Referring now to FIG. 5, payload deployment system 500 in accordance with another embodiment of the invention includes rectangular external shell 505, rectangular internal cargo unit 510 coupled to end cap 515, primary separation plane mechanism 520 and payload 525 fixedly coupled to external 30 shell 505. In this embodiment, primary separation plane mechanism 520 (e.g., a Lightband system) may be used to deploy internal cargo unit 510 (including end cap 515) which would then release its one or more payloads as described above. After deployment of internal cargo unit 510, payload 525 is exposed to the environment. This configuration may be particularly useful to maximize the utilization of space/volume when the payload to be ejected is small. In such situations, hands-off experiments that require a microgravity environment may be exposed (e.g., payload 525) and safely returned to earth for follow-up study.

Figure 6:
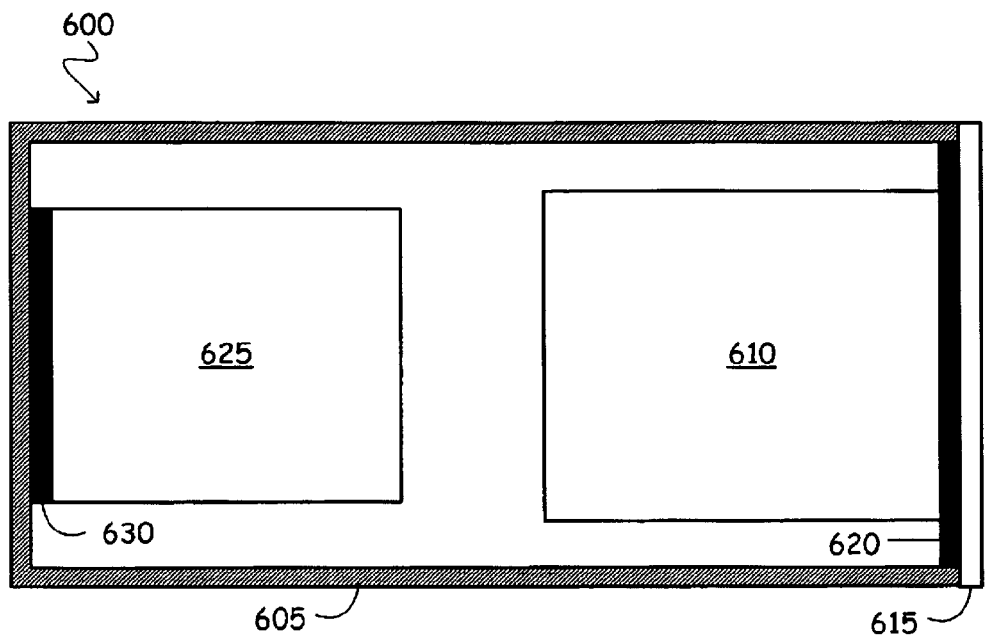
FIG. 6 illustrates a payload deployment system in accordance with yet another embodiment of the invention.

Referring to FIG. 6, payload deployment system 600 in accordance with yet another embodiment of the invention includes external shell 605, internal cargo unit 610 coupled to end cap 615 and primary separation plane mechanism 620 as shown in FIG. 5. In this embodiment, however payload 625 may be coupled to external shell 605 through separation plane mechanism 630. In this embodiment, payload 625 may deployed in a controlled manner subsequent to deployment of payload 610. One of ordinary skill in the art will recognize that an internal control unit (such as that illustrated in FIG. 3) will typically be included within external shell 605 to activate separation plane mechanism 630 and separation plane mechanism 620 if it is not controlled (activated) externally. Alternatively, activation of separation plane mechanism 630 may be effected from the launch vehicle. As discussed above, payload 610 and/or payload 625 may encapsulate one or more separate payloads, each of which may be deployed in accordance with the techniques described herein.

Figure 7:
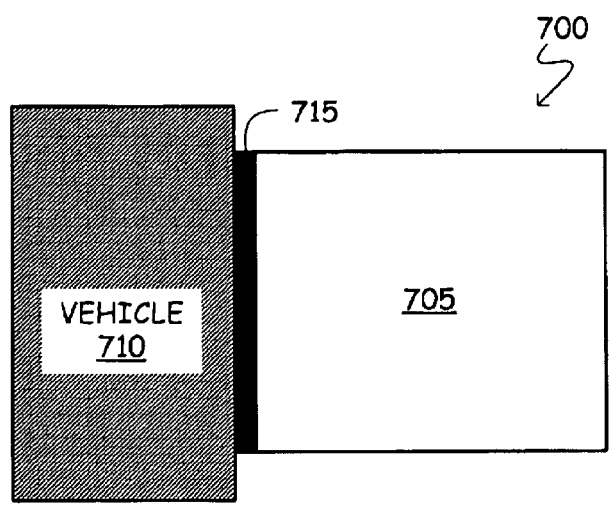
FIG. 7 illustrates a payload deployment system in accordance with the invention especially adapted for use with expendable launch vehicles.

Referring to FIG. 7, another embodiment of a payload deployment system 700 in accordance with the invention is shown that is especially well suited for use with unmanned or expendable launch vehicles. As illustrated, payload container 705 is coupled to launch vehicle 710 through separation means 715. In this embodiment, container 705 may be substantially internal cargo unit 115 of FIG. 1. That is, for use with an expendable launch vehicle, internal cargo unit 115 with end cap 120 (e.g., container 705), may be attached to primary separation plane mechanism (e.g., 715) which itself may be attached directly to launch vehicle 710. As discussed above, container 705 may encapsulate one or more payloads, one or more additional separation plane mechanisms and control circuitry.

Various changes in the materials and conformations of the illustrated deployment system are possible without departing from the scope of the following claims. For instance, the illustrative system of FIGS. 1, 2 and 4 illustrate the use of cylindrical outer shells and internal cargo units. This is not necessary as illustrated in FIG. 5. Payload deployment systems in accordance with the invention may employ any suitable geometry. The only practical limitation is that the technology selected to implement separation plane mechanisms must be conformant to the selected geometry. It is further noted that deployment systems in accordance with the invention are not required to have two payloads (see FIGS. 2 and 5) or two separation plane mechanisms (see FIG. 2) or that any payload be a sphere (compare FIGS. 2 and 5). Specifically, a deployment system in accordance with the invention may provide for one or more payloads some of which may remain fixed to the external shell and some of which may be physically ejected from same, may provide one or more separation plane mechanisms (the number being dependent upon the number of payloads to be ejected), and may accommodate payloads of various geometries.

One of ordinary skill in the art will recognize the manifest benefits provided by a deployment system in accordance with the invention. For example, one benefit of a deployment system in accordance with the invention is that it allows payloads to be processed for launch without significant visibility by launch vehicle personnel. Another benefit is that deployment systems in accordance with the invention do not utilize mechanical door systems and, as a consequence, are not susceptible to the failure of a door to open prior to payload deployment or the closure of a door subsequent to payload deployment. As a consequence, deployment systems in accordance with the invention can eliminate the possibility of requiring manual intervention of the flight crew to shut a failed door (i.e., a space walk). A related benefit is that in the event of deployment failure (e.g., failure of a primary separation plane mechanism), deployment systems in accordance with the invention do not present a flight-operations safety issue. That is, should a primary separation plane mechanism fail to operate, no flight personnel contingency actions are necessary; the system may be safely returned to earth in the same condition as it was launched. Yet another benefit of a deployment system in accordance with the invention is that it provides a means to deploy multiple payloads simultaneously or, in the alternative, in a staged or sequential manner within a specified time frame. These and other benefits of a deployment system in accordance with the invention will become apparent to one of ordinary skill in the art in light of the following description.

Accordingly, while the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A space-based payload deployment system, comprising:
   tube having an open end;
   a container having an end cap, the container adapted to fit in the external tube such that the end cap seals the open end; and
   a separation means adapted to separate the container from the external tube.

2. The space-based payload deployment system of claim 1, wherein the container comprises a payload.

3. The space-based payload deployment system of claim 1, wherein the container is further adapted to comprise:
   a plurality of payloads; and
   one or more additional separation means for separating each of the plurality of payloads from the container.

4. The space-based payload deployment system of claim 3, wherein the container is further adapted to comprise a control means for activating the one or more additional separation means at predetermined times.

5. The space-based payload deployment system of claim 1, wherein the external tube comprises a tube having a substantially cylindrical cross-section.

6. The space-based payload deployment system of claim 1, wherein the separation means comprises a pyrotechnic separation means.

7. The space-based payload deployment system of claim 3, wherein the at least one of the additional separation means comprises a non-pyrotechnic separation means.

8. The space-based payload deployment system of claim 1, wherein the tube is further adapted to encapsulate a second container fixedly coupled to an internal surface of the tube, the second container remaining in the tube following separation of the container from the tube.

9. The space-based payload deployment system of claim 8, wherein the second container is adapted to encapsulate a plurality of payloads.

10. The space-based payload deployment system of claim 8, wherein the second container comprises a payload.

11. The space-based payload deployment system of claim 1, wherein the tube is further adapted to comprise:

an additional separation means coupled to an internal surface of the tube; and a second container coupled to the additional separation means, said additional separation means adapted to eject the second container from the external tube following separation of the container from the tube.

12. The space-based payload deployment system of claim 11, wherein the second container is further adapted to encapsulate a plurality of payloads.

13. The space-based payload deployment system of claim 12, wherein the second container further comprises a plurality of separation means adapted to separate the plurality of payloads from the second container.

14. The space-based payload deployment system of claim 1, wherein the tube is adapted to mount to a surface in a Space Shuttle cargo bay.

15. A space-based payload deployment system, comprising:

a payload container adapted to encapsulate one or more payloads and one or more secondary separation means;

a primary separation means having a first mating surface adapted to couple to a surface of the payload container and a second mating surface adapted to couple to a surface of a launch vehicle;

wherein the primary separation means is adapted to separate the payload container from the first mating surface at a first predetermined time and the one or more secondary separation means are adapted to separate the one or more payloads from the payload container at one or more subsequent times.

16. The space-based payload deployment system of claim 15, wherein the payload container is further adapted to comprise a control means for activating the one or more secondary separation means.

17. The space-based payload deployment system of claim 15, wherein the primary separation means comprises a pyrotechnic separation means.

18. The space-based payload deployment system of claim 15, wherein at least one of the secondary separation means comprises a non-pyrotechnic separation means.

* * * * *